UNITED STATES PATENT OFFICE.

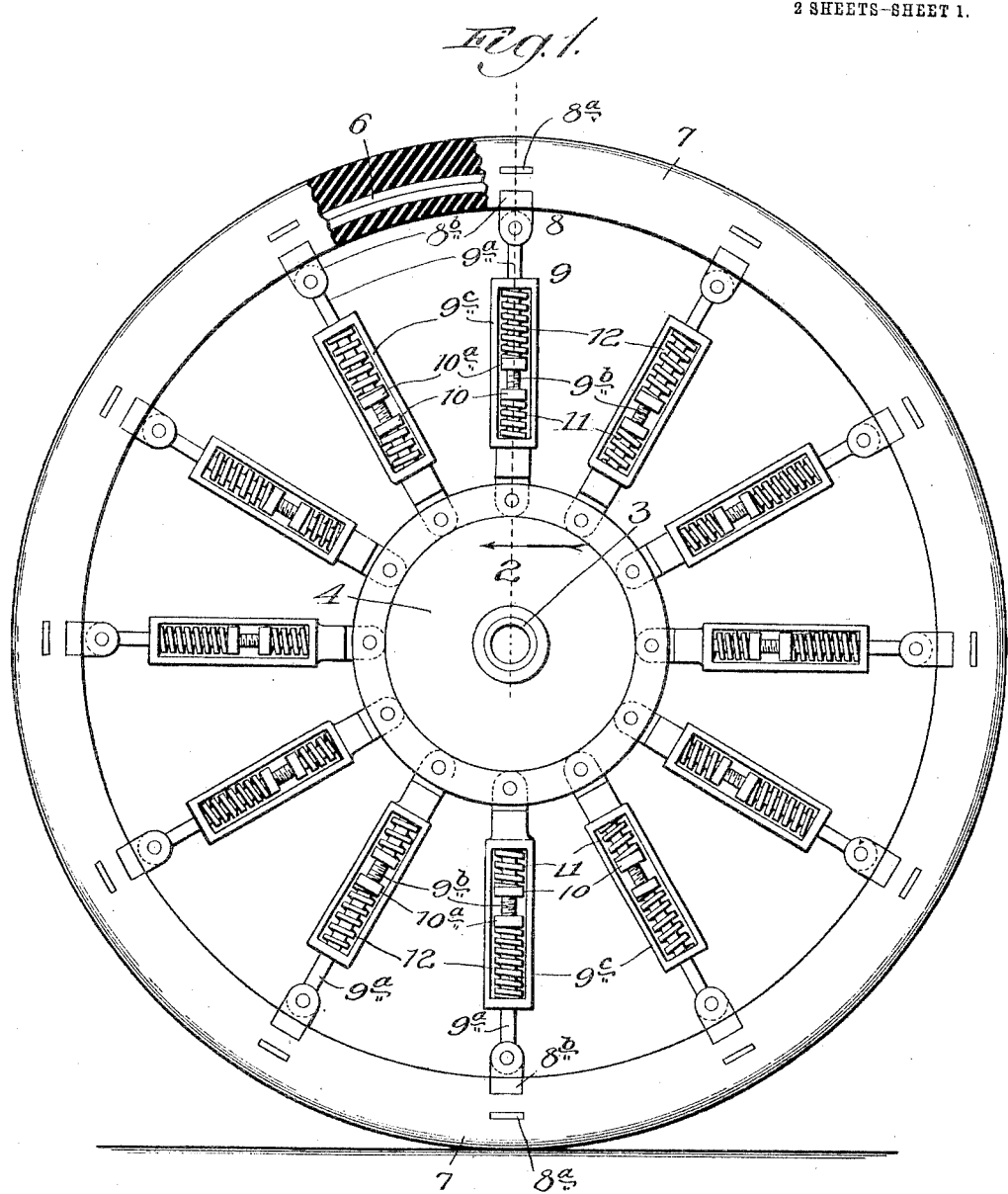

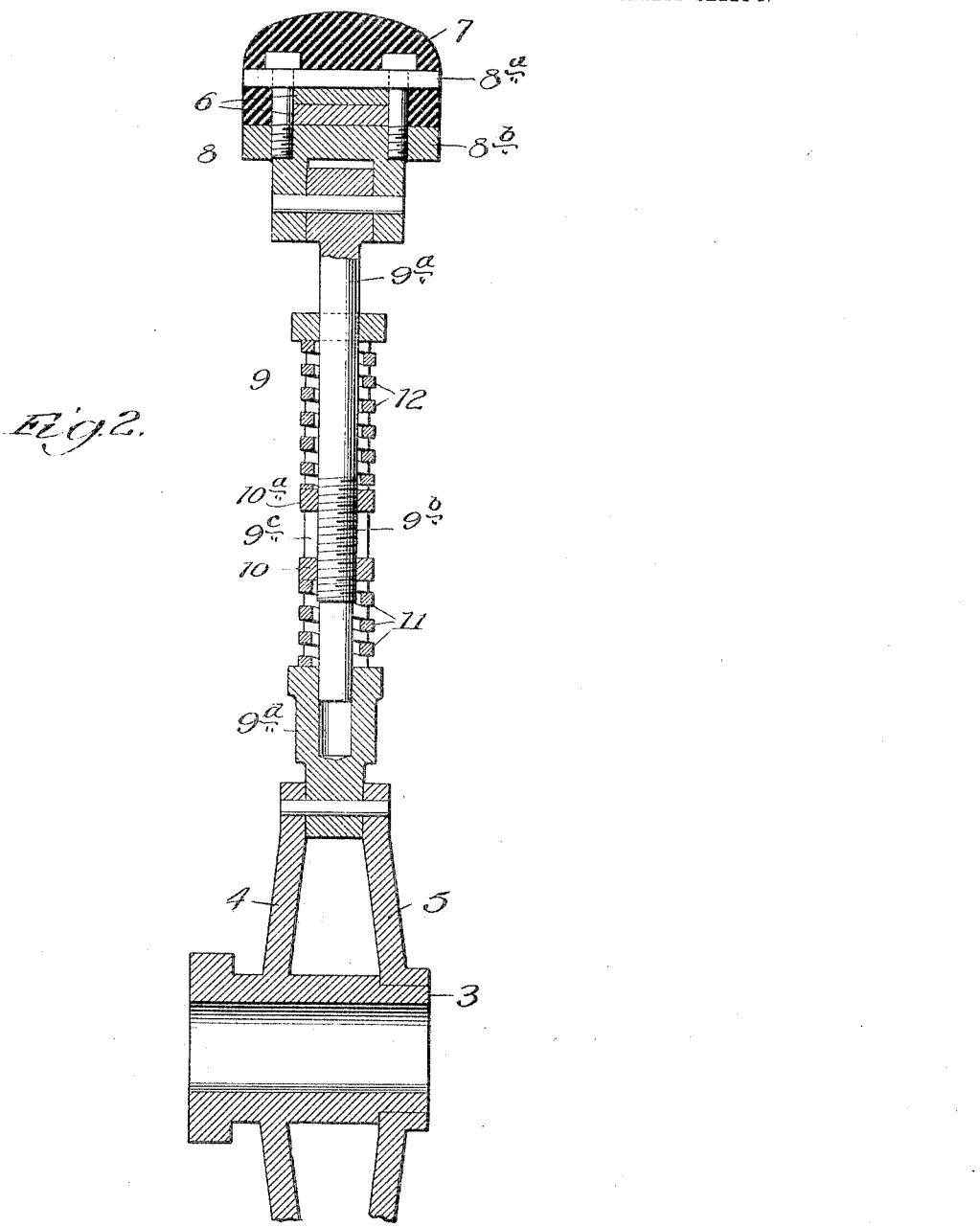

WILLIAM H. FAHRNEY, OF CHICAGO, ILLINOIS.

SPRING VEHICLE-WHEEL.

1,108,564.  Specification of Letters Patent.  Patented Aug. 25, 1914.

Application filed March 9, 1914. Serial No. 823,440.

*To all whom it may concern:*

Be it known that I, WILLIAM H. FAHRNEY, a citizen of the United States, residing at Chicago, in the county of Cook and State of Illinois, have invented a new and useful Improvement in Spring Vehicle-Wheels, of which the following is a specification.

My invention relates particularly to an improved construction of the springs used for connecting the wheel-center with the rim where the latter is an annular spring-band.

In the accompanying drawing, Figure 1 shows a wheel embodying my improvement by a view in side elevation, partly broken: and Fig. 2 is an enlarged section on line 2, Fig. 1.

The wheel-center shown is a hub 3 having a disk 4 formed integral with it and a companion-disk 5 fitting an offset near one end of the hub. The band-spring 6, shown to be formed of two concentric bands embedded in a solid tire 7 of rubber or other suitable material, carries at uniform intervals clips 8, each of the preferred construction illustrated in Fig. 2, comprising a cross-plate 8$^a$ and a socket-head 8$^b$ embracing the band-spring between them and rigidly fastened together by bolts crossing the opposite edges of the annulus and about which and the cross-plate and socket-heads the material of the tire 7 is shown to be molded. The center and band-spring are connected at each clip by a spoke-like spring-device 9. This device comprises a headed stem 9$^a$ pivotally pinned through the head in a socket-head 8$^b$ and provided between its ends with a threaded section 9$^b$, the stem extending through the outer-end and side members of an open rectangular metal frame 9$^c$ into a socket 9$^d$ in its lower member, which is pivotally pinned between the disks 4 and 5; on the stem-thread is a nut 10, between which and the inner end-member of the frame is confined a spiral spring 11, and a similar spring 12 is confined in the frame between its outer-end member and a nut 10$^a$ on the stem-thread.

To construct the wheel, an annular spring-band is used having a degree of rigidity that will cause it to resist flexure under a given load. The springs 12 of the spoke-like devices 9 are put by their nuts 10 under a tension sufficient to support that load and exert a uniform centripetal tension on the annular spring to maintain its circular shape under normal conditions. When, however, the wheel is subjected to strain beyond the aforesaid given load, as in encountering a stone or other obstruction in its path, the impact will flex the band 6 at the point where it encounters the obstruction and overcome the resistance of the springs 12 in the lower part of the wheel to permit resilient action of the annular band.

The springs 11 are put by the nuts 10 under a predetermined tension greater than that of the springs 12, and serve the purpose of causing the wheel to respond resiliently in case of an overload of given amount, such as results from the wheel entering a more or less deep rut. The overload is then taken by the springs 11 in compressing under its force in resiliently flexing the annular spring 6.

What I claim as new and desire to secure by Letters Patent is:—

1. A spring vehicle-wheel having an annular band-spring, a wheel-center, and spring-devices connecting the band-spring and wheel-center at intervals and each comprising a frame pivotally connected at its inner end with said center, a stem pivotally connected with the band-spring, said stem working lengthwise in the frame and having a threaded section, nuts on said threaded section, a spring confined about the stem between one nut and the outer end of the frame, and a spring confined about the stem between the other nut and the inner end of the frame.

2. A spring vehicle-wheel having an annular band-spring, a wheel-center, and spring-devices connecting the band-spring and wheel-center at intervals and each comprising a frame having a socket in its inner end at which it is pivotally connected with said center, a stem pivotally connected with the band-spring, said stem extending through the frame into said socket and having a threaded section, nuts on said threaded section, a spring confined about the stem between one nut and the outer end of the frame, and a spring confined about the stem between the other nut and the inner end of the frame.

WILLIAM H. FAHRNEY.

In presence of—
D. C. THORSEN,
A. C. FISCHER.

---

Copies of this patent may be obtained for five cents each, by addressing the "Commissioner of Patents, Washington, D. C."